(12) United States Patent
Leimann

(10) Patent No.: US 7,950,154 B2
(45) Date of Patent: May 31, 2011

(54) METHOD FOR FORMING A TAPER ROLLER BEARING ASSEMBLY

(75) Inventor: Dirk-Olaf Leimann, Antwerp (BE)

(73) Assignee: Hansen Industrial Transmissions N.V., Edegem (BE)

( * ) Notice: Subject to any disclaimer, the term of this patent is extended or adjusted under 35 U.S.C. 154(b) by 223 days.

(21) Appl. No.: 10/473,414

(22) PCT Filed: Mar. 25, 2002

(86) PCT No.: PCT/IB02/02131
§ 371 (c)(1),
(2), (4) Date: Mar. 10, 2004

(87) PCT Pub. No.: WO02/079658
PCT Pub. Date: Oct. 10, 2002

(65) Prior Publication Data
US 2004/0141674 A1 Jul. 22, 2004

(30) Foreign Application Priority Data
Mar. 30, 2001 (GB) .................................. 0107923.5

(51) Int. Cl.
*B21D 53/10* (2006.01)
(52) U.S. Cl. .................. 29/898.09; 29/898.07; 29/893.1; 29/893.2; 29/898.061; 29/898.062; 29/446; 29/447; 29/525

(58) Field of Classification Search ............... 29/898.07, 29/898.09, 893.1, 893.2, 898.061, 898.062, 29/446, 447, 506, 525
See application file for complete search history.

(56) References Cited

U.S. PATENT DOCUMENTS

| 1,815,689 | A |   | 7/1931  | Wiedmaier |
|-----------|---|---|---------|-----------|
| 4,441,570 | A | * | 4/1984  | Damm et al. ............... 180/9.62 |
| 4,629,354 | A | * | 12/1986 | Freese ........................... 403/261 |
| 5,795,037 | A |   | 8/1998  | Hagelthorn |
| 6,149,244 | A | * | 11/2000 | Wagner ..................... 301/105.1 |
| 6,327,773 | B1 | * | 12/2001 | Rode ............................. 29/724 |

FOREIGN PATENT DOCUMENTS
DE 33 04 358 8/1984
* cited by examiner

*Primary Examiner* — Sarang Afzali
(74) *Attorney, Agent, or Firm* — Young & Thompson

(57) ABSTRACT

An assembly of a pair of roller bearings in which the inner bearing rings are axially spaced apart by a first member and the outer bearing rings are spaced apart by a second member with one of the inner or outer ring of each bearing being an axially outer bearing ring spaced axially further from the outer bearing than the other ring of that bearing. The method comprises forming an assembly of the two members and bearings in which one of the axially outer bearing ring is a loose fit on one of the first and second members, and then axially moving the axially outer bearing ring of the one bearing which is loose fit in a direction towards the other bearing to create a pre-load, and then increasing the degree of pre-load to effect elastic deformation of that ring and thereby create a shrink fit type interface load.

14 Claims, 2 Drawing Sheets

METHOD FOR FORMING A TAPER ROLLER BEARING ASSEMBLY

This invention relates to a method for forming a taper roller bearing assembly and in particular, though not exclusively, to a method of forming an assembly of a taper roller bearing secured to a shaft of an industrial gear unit.

The inner ring, known commonly as the cone, of a taper roller bearing conventionally needs to be secured as a shrink fit on a rotatable member such as a shaft part of the housing of a gear unit. The strength of the shrink fit is selected having regard to recommendations of the bearing manufacturers based on the type of loads which the bearing is likely to experience in use. A shrink fit is required in order to avoid fretting corrosion and consequential damage to the bearing.

In contrast to the requirement for a shrink fit of the inner ring of the taper roller bearing, a shrink or similar tight fit is not required in respect of an outer ring, known commonly as the cup, when located in a gear unit housing because in the load on the outer ring acts generally in a constant direction. In consequence the tolerance between the cup and such as housing of the gear unit can be relatively loose.

In other constructions, such as of a planetary gear unit, it is the inner ring of a planet gear unit that is loaded radially in a substantially constant direction (relative to the planet gear carrier). The outer ring experiences a radial load that travels in direction around the outer ring during rotation of a planet gear, and in consequence it is necessary to ensure a tight fit of the outer ring in order to avoid fretting corrosion and consequential damage.

Conventionally, in order to obtain a shrink fit between a support shaft and a ring of a taper roller bearing it is necessary either to employ heat or a significant axial force. This requirement arises particularly in the case of gear units having a housing of a monolithic construction, without a split plane, and in which a shaft is mounted by means of a pair of axially spaced taper roller bearings in an O configuration in which each roller increases in diameter in a direction away from the other bearing of the pair.

One object of the present invention is to simplify the procedure for assembly and disassembly of a ring of a taper roller bearing relative to a support member such as the gear unit shaft. Another object is to provide a procedure which allows a better adjustment of bearing pre-load such that a higher bearing load capacity may be achieved.

In accordance with one aspect of the present invention there is provided a method for forming an assembly of a pair of taper roller bearings in which the inner bearing rings are axially spaced apart by a first member and the outer bearing rings are maintained spaced apart by a second member with one of the inner and outer rings of each bearing being an axially outer bearing ring which is spaced axially further from the other bearing than the other ring of that bearing, said method comprising forming an assembly of said two members and bearings in which the axially outer bearing ring of at least one of the bearings is a loose fit on one of the first and second members, and then axially moving said axially outer bearing ring of said one bearing which is a loose fit in a direction towards the other bearing to create a pre-load, and then increasing the degree of pre-load by further movement in said direction to effect elastic deformation of that ring which initially was a loose fit and thereby create a shrink fit type interface load between that ring of said one bearing and one of the first and second members.

Although the invention teaches that only one of the bearings of the pair need be a loose fit on one of the first and second members, optionally the axially outer ring of each the two bearings may be a loose fit on one of the members, and axial movement of the two axially outer bearing inner rings relative to one another may be employed to achieve a shrink fit type location of each of said rings relative to one of the first and second members.

The method maybe employed to create a shrink fit between each inner bearing ring and the first member. The first member may be a rotatable shaft, such as an intermediate shaft, of a gear unit and the second member may be a housing or housing insert of a gear unit.

The pair of bearings may be arranged in an O configuration in which case it is the inner rings that are considered to be axially outermost, or an X configuration in which the outer rings that are considered to be axially outermost.

Alternatively the method may be employed to create a shrink type fit between each outer bearing ring and the second member. The second member may be a planet gear and the first member may be a planet gear carrier.

The method of the invention teaches that the degree to which a bearing ring is a loose fit on a support member is selected such that the required pre-load to obtain a shrink fit does not exceed the maximum allowable pre-load for either of the two bearings.

Embodiments of the present invention will now be described, by way of example only, with reference to the accompanying diagrammatic drawings in which:—

Figure 1:
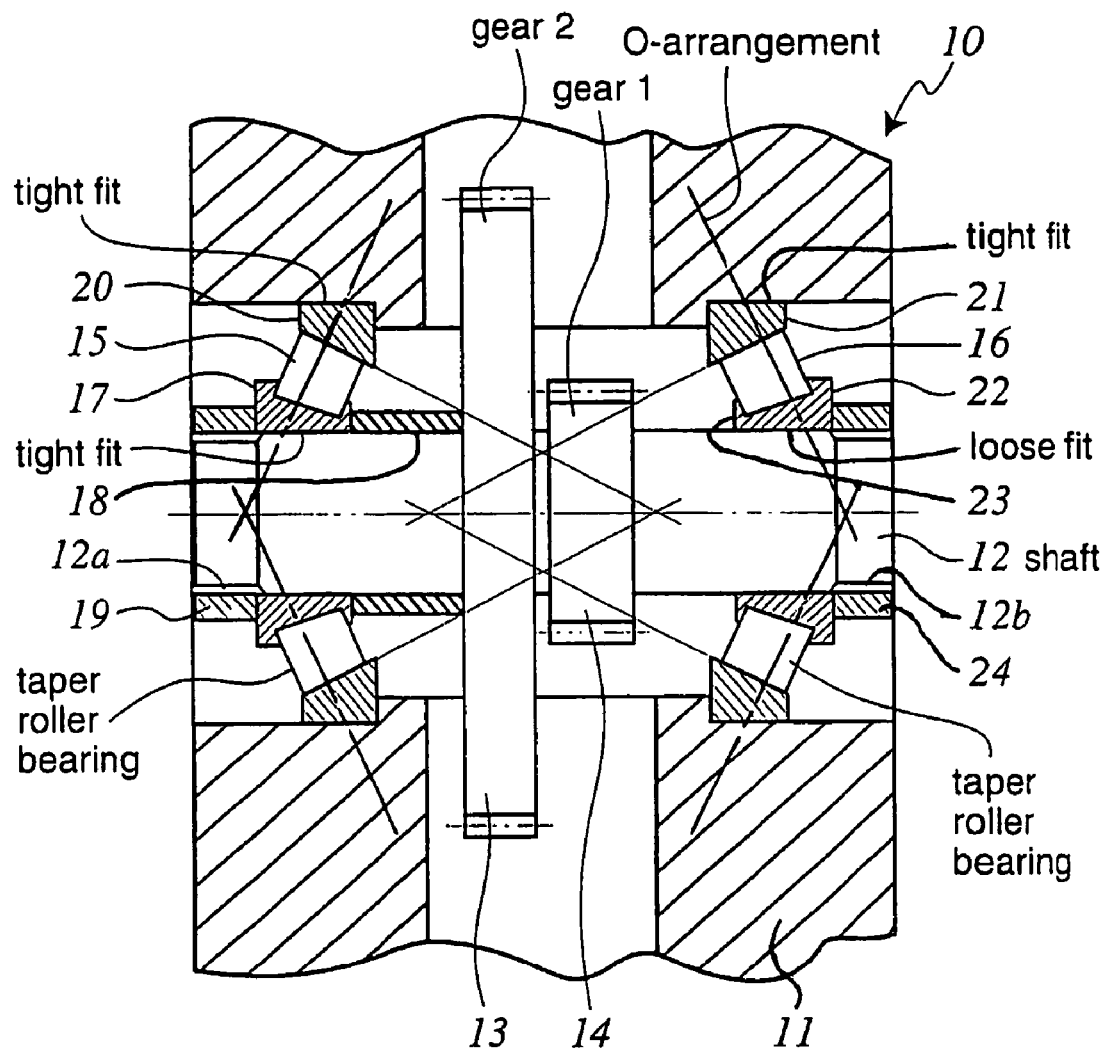
FIG. 1 is a sectional view of part of a gear unit formed by a method in accordance with the present invention.

A gear unit 10 comprises a housing 11, an intermediate shaft 12 which carries two teethed gear 13, 14, and a pair of taper roller bearings 15, 16 which rotatable support the shaft 12 relative to the housing 11.

The pair of axially spaced taper roller bearings are mounted in an O arrangement, as described more specifically in the specification of our co-pending UK Patent Application No. 0106004.5 entitled Gear Shaft Bearing Assembly.

The inner ring 17 of the taper roller bearing 15 abuts axially against one end of a spacer sleeve 18 the other end of which abuts against the toothed gear 13. The ends of the shaft 12 are provided with screw threads 12a, 12b, and a lock nut 19 secures the inner ring 17 axially against the sleeve 18. In addition, the ring 17 is secured to the shaft 12 by virtue of being a tight press fit thereon. Similarly, the outer ring 20 of the bearing 17 is a tight fit in the housing 11.

The outer ring 21 of the other bearing 16 is also a tight fit in the housing 11. In contrast to the bearing 17, however, for the bearing 16 the inner ring 22 is a loose, sliding fit over the shaft. Also in contrast to the arrangement for the bearing 15, no sleeve or like abutment is provided for contact by the axially inner edge 23 of the inner ring 22 of bearing 16.

To complete the aforedescribed assembly the lock nut 24 is fitted to the end of the shaft 12 and tightened to bear against the inner ring 22 and urge that inner ring axially towards the other bearing 15.

Figure 2:
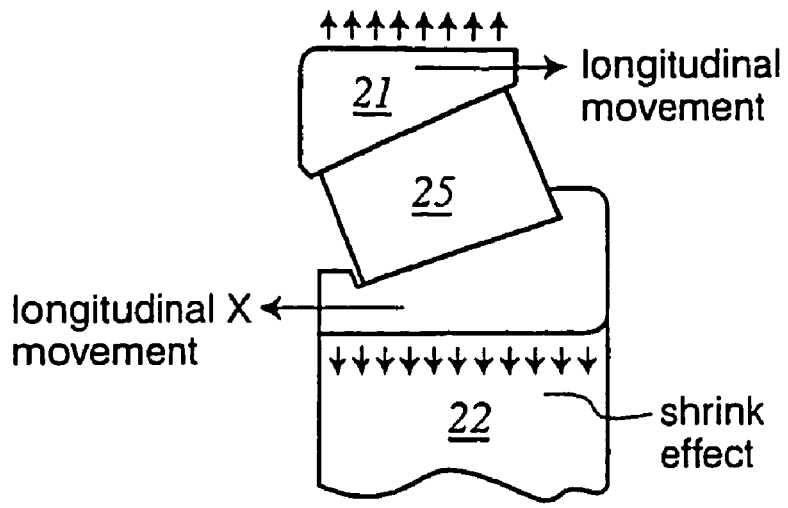
FIG. 2 shows in detail a part of a bearing of FIG. 1.

As can be seen more clearly by reference to FIG. 2, axial movement of the inner ring 22 in the direction X towards the other bearing ring, and thus axially relative to the outer ring 21 which is secured in position in the housing 11 results in the creation of radial forces by virtue of the taper shape of the bearing rollers 25. Although the resulting forces may be employed substantially solely to create elastic extension of the ring 21 and compression of the ring 22 and provide respective tight fits, in this embodiment in which the outer ring 21 is already a tight fit in the housing 11, the radial forces created by relative longitudinal movement of the inner and outer rings 22, 21 serves primarily to effect circumferential compression of the inner ring 22. Ring 22 is thereby caused it to shrink in diameter and become a tight fit on the shaft 12.

Figure 3:
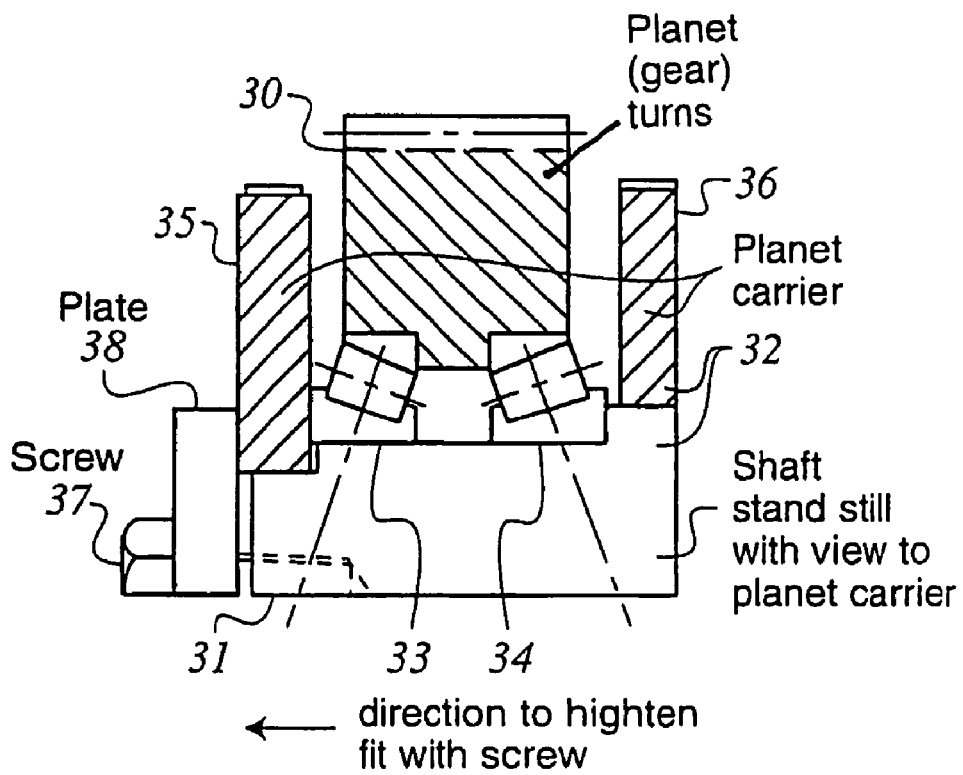
FIG. 3 is a sectional view of part of another gear unit formed by a method in accordance with the present invention.

FIG. 3 shows a planet gear 30 rotatable about the axis 31 of a planet gear carrier 32. The planet gear is rotatably supported relative to the carrier 32 by a pair of axially spaced taper roller bearings 33, 34 arranged in an O configuration.

In this construction planet carrier plates 35, 36 contact the respective radially inner rings of the bearings 33, 34 and one of the plates 35 the recess of a bolt 39 which is moveable axially relative to the carrier 32 by means of a screw 37 and plate 38 such that the inner rings can be moved together to pre-load the bearings. In this configuration it is desired to ensure that the outer rings of the bearings cannot slip or creep circumferentially relative to the planet gear 30, and that is achieved by moving plate 38 and bolt 39 sufficiently to create a bearing pre-load that elastically expands each outer ring into a tight fit relationship with the gear 30.

The invention claimed is:

1. A method for forming an assembly of a pair of taper roller bearings in which inner bearing rings are axially spaced apart by a first member and outer bearing rings are maintained spaced apart by a second member with a first of the inner and outer bearing rings of each taper roller bearing being an axially outermost bearing ring which is spaced axially further than a second of the inner and outer bearing rings of that taper roller bearing, said method comprising the sequential steps of:
    forming an assembly of said two members and taper roller bearings, having a taper shape, in which the axially outermost first bearing ring of at least one of the taper roller bearings is in a loose fit on one of the first and second members, and
    axially moving said axially outermost first bearing ring of said one taper roller bearing, which is in the loose fit, in a direction towards the second bearing ring to create a pre-load, and
    increasing the degree of pre-load by sufficient further movement of said axially outermost first bearing ring in said direction resulting in the creation of radial forces by virtue of the taper shape of the bearing rollers in order to elastically deform said axially outermost first bearing ring, which initially was a loose fit, to create a shrink fit location between said axially outermost first bearing ring and the one of the first and second members,
    wherein the first member is a rotatable shaft,
    wherein the rotatable shaft is an intermediate shaft of a gear unit,
    wherein two gears are mounted on the intermediate shaft, each of the two gears arranged for intermeshing with a gear on a shaft which is parallel to the intermediate shaft, and
    wherein the two gears mounted on the intermediate shaft are positioned in between the pair of taper roller bearings.

2. A method according to claim 1 wherein the second member is a housing or housing insert.

3. A method according to claim 2 wherein the second member is a housing or housing insert of a gear unit.

4. A method according to claim 3 wherein there is created a shrink fit between an outer bearing ring and the second member.

5. A method according to claim 4 wherein the second member is a planet gear.

6. A method according to claim 4 wherein the first member is a planet gear carrier.

7. A method according to claim 1 wherein the axially outermost ring of each the two taper roller bearings is in an initially loose fit on one of the first and second members, and the axial movement of the two axially outermost bearing rings relative to one another creates a shrink fit location of each of said axially outermost rings relative to the one of the first and second members.

8. A method according to claim 7, wherein,
    each axially outermost ring is the inner bearing ring, and
    there is created a shrink fit between each inner bearing ring and the first member.

9. A method for forming an assembly, comprising:
    forming a pair of taper roller bearings, having a taper shape, with radially inner bearing rings that are axially spaced apart on a rotatable shaft and radially outer bearing rings that are maintained spaced apart by a housing, with a first ring of the inner bearing ring and the outer bearing ring of a corresponding taper roller bearing being in an axially outermost position and a second ring of the inner bearing ring and the outer bearing ring of the corresponding taper roller bearing being in an axially innermost position, by
    a first step of forming an assembly of said shaft, said housing, and said two taper roller bearings in which the first ring is in an initial loose fit on the corresponding one of the shaft and housing,
    a subsequent second step of creating a degree of pre-load by axially moving the first ring in an axial direction towards the second ring, and
    a further subsequent step of increasing the degree of pre-load by further axial movement of the first ring in said axial direction sufficient to result in the creation of radial forces by virtue of the taper shape of the bearing rollers in order that the resulting radial forces elastically deform the first ring, which initially was in a loose fit and has been moved in the axial direction toward the second ring, the elastic deformation creating a shrink fit location between the first ring and said corresponding one of the shaft and housing,
    wherein the rotatable shaft is an intermediate shaft of a gear unit,
    wherein two gears are mounted on the intermediate shaft, each of the two gears arranged for intermeshing with a gear on a shaft which is parallel to the intermediate shaft, and
    wherein the two gears mounted on the intermediate shaft are positioned in between the pair of taper roller bearings.

10. The method according to claim 9, wherein, in the first step, the axially outer first ring of each the two taper roller bearings is the initial loose fit on shaft, and the axial movement of the two axially outer first rings relative to second rings creates a shrink fit location of each of said first rings relative to the shaft.

11. The method according to claim 9, wherein, the housing is a housing insert.

12. The method according to claim 9, wherein, the housing is a gear unit housing.

13. A method for forming an assembly, comprising:
    a first step of forming a pair of taper roller bearings, having a taper shape, with radially inner bearing rings that are axially spaced apart on a rotatable shaft and radially outer bearing rings that are maintained spaced apart by a housing, with each of the radially inner bearings rings being in axially outermost positions and each of the radially outer bearing rings being in axially innermost positions, at least one of the bearing rings being in an initial loose fit on the corresponding one of the shaft and housing, a second step of creating a degree of pre-load by axially moving the first one bearing ring, in the initial loose fit, in an axial direction relative the other bearing ring of the corresponding taper roller bearing, and a third step of increasing the degree of pre-load by further axial movement of the one bearing ring in said axial direction resulting in the creation of radial forces by virtue of the taper shape of the bearing rollers in order that the resulting radial forces elastically deform the one bearing ring sufficient to create a shrink fit location between the one bearing ring and the corresponding one of the shaft and housing, wherein the rotatable shaft is an intermediate shaft of a gear unit, wherein two gears are mounted on the intermediate shaft, each of the two gears arranged for intermeshing with a gear on a shaft which is parallel to the intermediate shaft, and wherein the two gears mounted on the intermediate shaft are positioned in between the pair of taper roller bearings.

14. The method of claim 13, wherein, the one bearing ring is one of the radially inner bearing rings and the axial movement is an inward longitudinal movement.

* * * * *